United States Patent Office 3,400,168
Patented Sept. 3, 1968

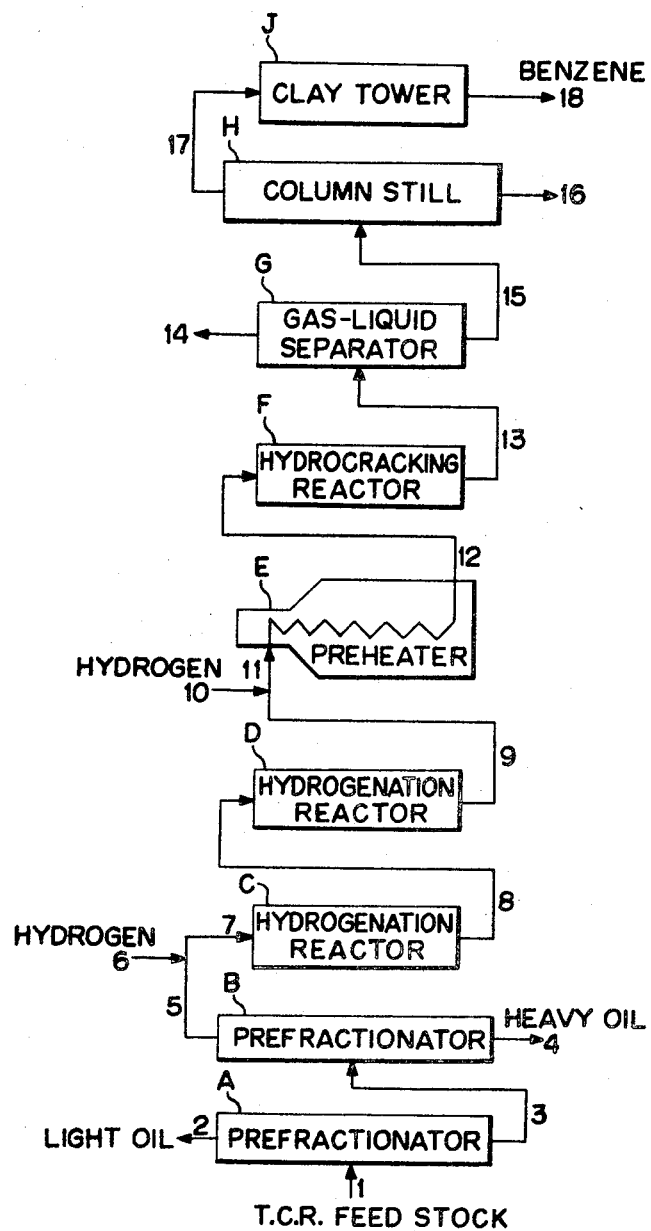

3,400,168
PRODUCTION OF HIGH-PURITY BENZENE FROM CRACKED PETROLEUM RESIDUES
Junichi Fukuda, Shinobu Masamune, Yasuo Suzuki, Mitsuo Sagara, and Yoshio Okabe, Yokkaichi-shi, Mie-ken, Japan, assignors to Mitsubishi Petrochemical Co., Ltd., Tokyo, Japan
Filed May 26, 1966, Ser. No. 553,136
Claims priority, application Japan, June 2, 1965, 40/32,263
4 Claims. (Cl. 260—672)

ABSTRACT OF THE DISCLOSURE

The residual fraction from the preparation of gaseous olefins by steam cracking of certain petroleum cuts is utilized as a feed stock for the production of high-purity benzene. This feed stock is subjected to a first stage hydrogenation in the presence of a solid hydrogenation catalysts such as cobalt-molybdenum or palladium, at a hydrogen-feed molar ratio of 0.2–2:0:1, at temperatures up to 250° C. and pressures of from 10 to 80 kg./cm. guage to convert diolefins, feeding the first stage product in a second stage hydrogenation in the presence of a solid hydrogenation catalyst at a temperature of from 300°–450° C., and a pressure of at least 10 kg./cm.$^2$ guage but preferably not in excess of 80 kg./cm.$^2$ guage to convert olefins.

The thus-hydrogenated fraction is subjected to hydrodealkylation in the third stage of the process at a temperature within the range 500°–800° C., a pressure of at least 10 kg./cm.$^2$ guage, a liquid hourly space velocity of 1–6 and a hydrogen-stock molar ratio of 2–10:1, preferably without a catalyst. The effluent from this third stage treatment is then separated into gaseous and liquid fractions and the latter is fractionally distilled to recover high-purity benzene therefrom.

---

This invention relates to a process for the production of high-purity benzene in high yield from a thermal cracked residue which is a by-product in the production of gaseous olefin from petroleum by steam cracking thereof.

The thermal cracked residue formed as a by-product in the production of gaseous olefin such as ethylene, propylene etc. by steam cracking of petroleum usually contains, though the content may vary depending upon the kind of the starting petroleum used and the cracking conditions thereof, more than 30% and sometimes more than 70% by weight based on the weight of the thermal cracked residue of aromatic hydrocarbons and, therefore, it has an extremely promising possibility as a good starting material for the production of aromatic hydrocarbons.

However, the thermal cracked residue contains large amount of reactive unsaturated hydrocarbons, particularly diolefin, and they may cause the formation of resinous or coke-like polymers upon heating in a heat exchanger or tubular preheater. The deposition of these polymers on the inside surfaces of the heat exchanger or the conduits not only decreases the thermal conductivity of the equipments but also clogs these conduits in a short period of time. Thus, the thermal cracked residue may not be heated at high temperatures directly in these heat exchanger or tubular preheater. Furthermore, the thermal cracked residue contains about 0.01 to about 0.1% by weight of sulfur compounds which consists mainly of thiophenes which are so thermally stable that it is impossible for them to be thermally converted to compounds capable of being readily separated from benzene.

Accordingly, the removal of diolefin and thiophenes from the thermal cracked residue in an economical way has been the most important problem to be solved in order to obtain high-purity aromatic hydrocarbons, particularly benzene, therefrom in high yield.

In the past, there has been adopted a complicated multi-stages process for recovering high-purity aromatic hydrocarbons from the thermal cracked residue which involves a first stage of hydrogenation, a second stage of another hydrogenation, a third stage of a solvent extraction and a fourth stage of distillation.

More particularly, in the prior art processes the hydrogenation process of the first stage mentioned above is a conversion of diolefin contained in the thermal cracked residue by hydrogenation thereof into monoolefinic and/or paraffinic hydrocarbons. The second stage of hydrogenation is a process wherein mono-olefin is converted into paraffinic hydrocarbons and, simultaneously, sulfur compounds contained in the thermal cracked residue are subjected to hydrocracking reaction to be converted into hydrogen sulfide which is subsequently separated and removed. The prior processes, as described above, comprises hydrogenating the thermal cracked residue in two stages, extracting aromatic components with solvent from the resulting hydrogenated products, separating aromatic hydrocarbons from aliphatic hydrocarbons, and distilling the extract containing aromatic components thereby obtaining aromatic hydrocarbons such as benzene, toluene, xylene and the like. Since benzene has particularly increasing demand among these aromatic hydrocarbons, it has been a conventional method in the prior art for the production of a large amount of benzene that alkylaromatic hydrocarbons such as toluene and xylene obtained in the above-mentioned process are further submitted to hydrodealkylation process to convert them into the desired benzene.

However, such processes of prior art require extremely complicated processes and operations involving the first stage of hydrogenation, the second stage of another hydrogenation, the solvent extraction and the subsequent hydrodealkylation, and particularly, the solvent extraction process wherein aromatic hydrocarbons are separated from aliphatic hydrocarbons is extremely complicated in operations, therefore, such processes of prior art can by no means be a satisfactory process from the economical point of view.

The reason for the necessity of solvent extraction in the prior process described above is that a portion of aliphatic hydrocarbons initially contained in the thermal cracked residue and produced by hydrogenation process form azeotropic mixtures with benzene or toluene which have boiling points very close to those of benzene or toluene. Therefore, the separation of these non-aromatic hydrocarbons by distillation hardly gives satisfactory results even if a column still having very many theoretical plates is used.

It is, therefore, an object of this invention to provide a simplified process for the production of high-purity benzene from thermal cracked residue which is formed as a by-product in the production of gaseous olefin such as ethylene, propylene etc. by steam cracking of petroleum hydrocarbons.

Another object of this invention is to provide a process for the production of high-purity benzene from thermal cracked residue readily and in high yield, without requiring solvent extraction operation.

Still another object of this invention is to provide an economical process enabling the recovery of high-purity benzene from said thermal cracked residue at low cost.

Other objects and features of the process of this invention will become apparent from the description given hereinafter.

The thermal cracked residue which may be used in the process of this invention consists predominately of C-6 to C-9 hydrocarbons, a diene value of 10 to 25, and a content of aromatic essentially consisting of monocyclic compounds of 70 to 95%. For the sake of simplicity, such thermal cracked residue will be hereinafter referred to as "T.C.R. feed stock".

The present invention is directed to the production of high-purity benzene from such T.C.R. feed stocks as referred to above readily and in high yield.

In accordance with this invention, there is provided a process for the production of high-purity benzene which comprises (1) a first stage of bringing a T.C.R. feed stock in the presence of hydrogenation catalyst in a first reaction zone maintained at a temperature of from ambient temperature to 250° C. and a pressure of more than 10 kg./cm.$^2$ gauge into contact with 0.2 mol or more of hydrogen per mol of said T.C.R. feed stock to convert diolefin contained in said T.C.R. feed stock to mono-olefinic and/or paraffinic hydrocarbons; (2) a second stage of further bringing the product obtained in the preceding first stage in the presence of hydrogenation catalyst in a second reaction zone maintained at a temperature of from 300° to 450° C. into contact with hydrogen to convert olefin contained in said product into paraffinic hydrocarbons, and, simultaneously, to convert sulfur compounds contained in said T.C.R. feed stock consisting mainly of thiophenes into hydrogen sulfide, separating and removing the same; (3) a third stage of subjecting the product obtained in the second stage in the absence of solid dealkylation catalyst in a third reaction zone to hydrocracking of said paraffinic hydrocarbons to convert them into lower saturated hydrocarbons such as methane, ethane, etc., and, simultaueously, to hydrodealkylation of the alkylaromatic hydrocarbons contained in the T.C.R. feed stocks to convert them into benzene under conditions including a temperature of from 500 to 850° C. and a pressure of more than 10 kg./cm.$^2$ guage and in contace with hydrogen of from 2 to 10 mols per mol of T.C.R. feed stock; and (4) a fourth stage of recovering benzene from the product of the third stage in a conventional method such as distillation.

Briefly stated, this invention provides a process for the production of high-purity benzene from T.C.R. feed stock which comprises bringing said T.C.R. feed stock in the presence of hydrogenation catalyst at a temperature of from ambient temperature to 250° C., and a pressure of from 10 to 80 kg./cm.$^2$ gauge into contact with hydrogen of from 0.2 to 2.0 mols per mol of T.C.R. feed stock; then effecting hydrogenation reaction of the obtained product in the presence of hydrogenation catalyst at a raised temperature of from 300° to 450° C.; and effecting further hydrocracking hydrodealkylation reactions simultaneously with the use of hydrogen of from 2 to 10 mols per mol of T.C.R. feed stock under reaction conditions including a temperature of from 500° to 850° C., and a pressure of from 10 to 60 kg./cm.$^2$ gauge thereby producing high-purity benzene.

Each respective step of the process of this invention will be explained more in detail in the following.

THE FIRST STAGE

The hydrogenation reaction in this stage may be carried out either in fixed bed using granulated catalyst or in fluidized bed using finely powdered catalyst.

Any conventional hydrogenation catalyst or a mixture thereof may be conveniently used in the process of this invention. For example, oxides or sulfides of metals of Groups VI and VIII of the Periodic Table of the Elements may be used. These catalysts may be conveniently supported on a suitable carrier, such as activated alumina, synthetic or natural silicate, oxides of magnesium, zirconium or titanium, or the like.

Typical examples of these catalysts include Ni, Pd, Pt, cobalt molybdate, $WS_2$, NiS, $MoS_2$, $CoMoO_4$-$Al_2O_3$, $MoS_2$-active carbon, Co-Fe-Ni, $WS_2$-NiS-$Al_2O_3$, Cr-Mo-W sulfides and palladium or cobalt-molybdenum catalysts are particularly preferable.

Reaction conditions of this stage of the present process may vary depending upon the kind of catalyst used, although, in general, the T.C.R. feed stocks are brought into contact with hydrogen in the presence of catalyst at a temperature of from ambient temperature to 250° C., under a pressure of more than 10 kg./cm.$^2$ gauge. Upon effecting the reaction, the reaction temperature should under no circumstances exceed 250° C. so as to inhibit the polymerization of diolefin.

In the case of using cobalt-molybdenum catalysts, the reaction conditions including a temperature of from 150° to 230° C. and a pressure of from 10 to 80 kg./cm.$^2$ gauge are particularly preferred for hydrogenating diolefin and only a portion of mono-olefin selectively while inhibiting the polymerization of diolefin.

If palladium catalyst is used, the preferred reaction conditions include a temperature of from 20° to 60° C. and a pressure of from 10 to 80 kg./cm.$^2$ gauge, and, then, catalyst poisons such as carbon monoxide and hydrogen sulfide contained in hydrogen and the T.C.R. feed stocks are preferably eliminated before the reaction which otherwise will deactivate the catalyst.

Hydrogen of from 0.2 to 2.0 mols per mol of T.C.R. feed stocks may be used in this stage. If the amount of hydrogen exceeds 2.0 mols, diolefin contained in T.C.R. feed stocks tends to evaporate and polymerize, and causes clogging of conduits. On the other hand, hydrogen less than 0.2 mol will not give sufficient hydrogenation effect.

In the first stage of the process of this invention, the reaction pressure should essentially be at least 10 kg./cm.$^2$ gauge or more. The reason is that the activity of the catalyst may be decreased under the lower pressure and hydrogenation of diolefin may only be insufficiently achieved. Although no particular restriction is imposed on the upper limit of the reaction pressure, the increase in pressure beyond the level of 80 kg./cm.$^2$ gauge does not accompany any particular increase in the catalyst activity. On the other hand, in view of the fact that as the pressure increases, more problems as to equipment and operation will be derived therefrom, the increase in pressure exceeding 80 kg./cm.$^2$ gauge is not desirable.

THE SECOND STAGE

In the hydrogenation reaction of this stage, the same catalyst as used in the first stage of the process of this invention may be conveniently used, and cobalt-molybdenum catalyst or nickel-molybdenum catalyst are particularly preferred. It is essential in this stage to carry out the reaction at a temperature of from 300° to 450° C. under a pressure of from 10 to 80 kg./cm.$^2$ gauge. In the second stage of the process of this invention, the reaction pressure should essentially be at least 10 kg/cm.$^2$ gauge or more. The reason is that the activity of the catalyst may be decreased under the lower pressure, and hydrogenation of olefin and hydrogenolysis of sulfur compounds may only be insufficiently achieved. Although no particular restriction is imposed on the upper limit of the reaction pressure, in general, the increase in pressure beyond the level of 80 kg./cm.$^2$ gauge does not accompany any particular increase in the catalyst activity. On the other hand, in view of the fact that as the pressure increases, more problems as to equipment and operation will be derived therefrom, the increase in pressure exceeding 80 kg./cm.$^2$ gauge is not desirable.

As for the temperature conditions, the temperature should essentially be at least 300° C. or more, because in the lower temperature range the catalyst activity is lowered and hydrogenolysis of sulfur compounds, particularly of thiophene, may only be unsatisfactorily accomplished.

Further, it is also essential that the temperature should not exceed 450° C. because the cracking of aliphatic hydrocarbons begins to take place at the temperature of about 400° C., and at the temperature of higher than 450° C., the formation of coke on the catalyst due to the cracking mentioned above gives adverse effect on the catalyst activity.

So far as hydrogen used in this stage is concerned, the same molar ratio as used in the first stage or more may be used, and the surplus hydrogen of the first stage of the process of this invention may be sufficiently and conveniently used.

By practising the first and second stages of the process of this invention described above, the extremely reactive ingredients in the T.C.R. feed stocks such as diolefin are converted into stabilized forms, and sulfur compounds are completely decomposed into hydrogen sulfide thus the resulting product may be suitably used as a starting material for the hydrocracking and hydrodealkylation process of the third stage of the present process.

The T.C.R. feed stocks which have been hydrogenated in the foregoing stages are introduced to the third stage of the process of this invention and the surplus hydrogen in the hydrogenating process of the second stage may be fed to and utilized in the third stage.

THE THIRD STAGE

An object of this reaction stage resides in hydrodealkylation of alkylaromatic hydrocarbons and also in a complete hydrocracking of non-aromatic hydrocarbons to convert them into lower saturated aliphatic hydrocarbons such as methane, ethane, etc. to facilitate the separation thereof from aromatic hydrocarbons.

The reaction conditions accomplishing the object of this reaction stage include a temperature of from 500° to 800° C., and preferably from 650° to 730° C., liquid hourly space velocity of from 1 to 6, and preferably from 2 to 4, and preferred molar ratio of hydrogen to T.C.R. feed stock of 2–10:1.

If the reaction pressure is excessively lowered, a small amount of non-aromatic hydrocarbons such as olefin remains unchanged as impurities in the desired aromatic hydrocarbons, and, therefore, the reaction pressure of at least 10 kg./cm.$^2$ gauge or more should be used. As the reaction pressure increases, the reaction rate is also increased to a certain extent, however, such tendency ceases to exist beyond the level of 60 kg./cm.$^2$ gauge, therefore, further increase in the pressure is undesirable in view of the complications in equipment and operations.

The use of a solid dealkylation catalyst in this reaction stage is unnecessary, and it is desirable to conduct the reaction in the absence of catalyst. Because, in catalytic method the activity of catalyst may often be adversely affected by a small amount of sulfur compounds or other impurities contained in the T.C.R. feed stock.

The third stage of the process of this invention has a great advantage in view of the material of which the required reactors are made in comparison with the conventional dealkylation process using pure toluene, xylene or catalytic reformate as a starting material. Namely, in the conventional thermal dealkylation process using a steel reactor, the breakage of benzene nucleus occurs due to the catalyzing effect of the surface of the steel which results in the formation of a large amount of carbonaceous material, thus the yield of benzene is adversely affected to an extremity and also the continuous operation becomes impossible. On the other hand, in the process of this invention, even with the use of conventional steel reactor, the formation of carbonaceous materials is prevented by the presence of a small amount of hydrogen sulfide formed in the hydrogenation reaction in the preceding second stage.

THE FOURTH STAGE

The liquid product obtained in the preceding third stage of the process of this invention from which gaseous products such as methane, hydrogen and the like have been removed consists essentially of benzene and a small amount of toluene and tarry matters.

Therefore, in this stage of the process of this invention, benzene is separated from the liquid product obtained in the preceding third stage by suitable means such as distillation.

Benzene thus obtained may be readily turned into a product having extremely high-purity by a simple treatment using activated clay etc.

As described above, according to the process of this invention, high-purity benzene may be produced in an extremely high yield by a simple process, and at the same time such by-products as toluene and the like may also be obtained in small amounts. Toluene thus obtained may, if desired, be converted into benzene by recycling the same into the third stage together with the feed stocks.

In the process of this invention, as sources of supply for hydrogen used in the process, not only the purified hydrogen but also such hydrogen-containing gases as reformer off gas, by-product gas obtained in dehydrogenation of ethyl-benzene, cracking gas, methane steam reforming gas, coke oven gas and recycling gas in the process of this invention may be utilized.

The process of the present invention may be understood more clearly with reference to the accompanying drawing which shows a schematic flow diagram illustrating a process for producing benzene from the T.C.R. feed stocks. For the sake of simplicity, various appendant apparatus such as pumps, heat exchangers, condensers etc. have been omitted from the drawing.

Referring to the drawing, the T.C.R. feed stocks enters a prefractionator A through line 1. Light oils having less than 5 carbon atoms are removed from the top of the prefractionator A through line 2 and the distilland from the bottom of the prefractionator A is fed to another prefractionator B through line 3. Heavy oils having more than 9 carbon atoms are removed from the bottom of the prefractionator B thorugh line 4, and the distillate having from 6 to 8 carbon atoms is removed as overhead from the top of the prefractionator B thorugh line 5. The distillate is then led via line 7 to a reactor C in admixture with a hydrogen gas supplied from line 6 where hydrogenation reaction is effected. The amount of hydrogen supplied through said line 6 depends upon the kind of catalyst. If palladium catalyst is used, the introduction of hydrogen of from 0.2 to 0.5 mol per mol of the T.C.R. feed stock is preferable. In this instance, the use of recycling gas from line 14 which contains hydrogen sulfide should be avoided. When cobalt-molybdenum catalyst is used, the amount of hydrogen of from 0.5 to 2.0 mol per mol of the T.C.R. feed stock and a reaction temperature of from 150° to 230°C. are preferred. It should be noted in this instance that there is a temperature rise in the reactor due to the exothermic reaction, and, therefore, the inlet temperature of the reactor must be carefully controlled so that the outlet temperature of the reactor will not exceed 250°C.

The product effluent i.e. a mixture of T.C.R. feed stocks and hydrogen leaving the hydrogenation reactor C is led to a second stage hydrogenation reactor D through line 8. Said reactor D is maintained at a temperature of from 300° to 400°C. and the source of heat from maintaining said temperature may be obtained from the product of subsequent hydrocracking reactor F.

The product effluent leaving said hydrogenation reactor D is conducted to a preheater E through line 9, 11 in admixture with hydrogen supplied from line 10. At this point, the introduction of hydrogen thorugh line 10 must be controlled so as to maintain the molar ratio of hydrogen to the T.C.R. feed stock of 2–8:1, and the supplied hydrogen can be taken from the line 14. Said preheater E is usually of the tubular external heating type.

The mixture of hydrogen and T.C.R. feed stock is heated in said preheater E up to from 600° to 700°C., and the mixture is then led to a hydrocracking reactor F through line 12. The reaction in said reactor F may generate a considerable heat of reaction, and exceptionally increase the reaction temperature, if an insulated reactor is used. In some cases, hydrogenated oil, hydrocracked oil or cooling hydrogen are preferably introduced to the reactor at an intermediate portion thereof for the prevention of an extraordinary temperature rising in the reactor.

The resultant product of the reactor F is then introduced to a gas-liquid separator G through line 13 while cooled down to an ambient temperature during the flow therethrough. The great majority of the heat discharged in the cooling stage may be recovered and utilized for the generation of steam and preheating of lines 5 and 8.

In said separator G, gaseous ingredients such as hydrogen, methane, ethane and the like are discharged from the system through line 14 and a portion thereof is recycled to lines 6 and 10. The remaining portion of the discharged gas from line 14 may be used as a fuel for heating aforesaid preheater E, or, if necessary, may be utilized as a source of hydrogen used in the process of this invention by recovering hydrogen thereform according to oil absorbing method, or methane steam reforming method, etc.

The liquid product of the separator G, on the other hand, is led to a column still H through line 15. The distilland having higher boiling point than that of toluene is discharged from the bottom of the said column H through line 16.

The desired benzene is removed as overhead from the top of said column through line 17 and introduced to a clay tower J wherein a trace of olefin is removed and highly purified benzene is discharged from the system through line 18.

The process of this invention may further be explained in the following examples more practically. However, it should not be construed that these examples restrict the present invention since they are given merely for the purpose of illustration:

Example 1

Thermal cracked residue obtained as a by-product in the production of gaseous olefin such as ethylene, propylene and the like by steam cracking of straightrun gasoline having boiling point of from 40° to 160° C. was distilled to remove light oil fraction having less than 5 carbon atoms and heavy oil fraction having more than 9 carbon atoms. The remaining fraction having boiling point of from 67° to 144° C. was introduced to the first stage of the process of this invention as a starting material. The properties of said feed stocks are given in the following Table 1:

Table 1

FRACTIONAL DISTILLATION

| | ° C. |
|---|---|
| Initial boiling point | 67.0 |
| Percent: | |
| 5 | 77.0 |
| 10 | 81.5 |
| 30 | 89.2 |
| 50 | 98.0 |
| 70 | 108.0 |
| 90 | 130.5 |
| 90 | 137.0 |
| Dry point | 144.0 |

CONTENT OF IMPURITIES

| | |
|---|---|
| Bromine number | 34.0 |
| Diene value | 19.7 |
| Sulfur content wt. percent | 0.047 |

COMPOSITION OF AROMATICS [1]

| | Wt. percent |
|---|---|
| Benzene | 25.8 |
| Toluene | 23.0 |
| Ethylbenzene | 7.1 |
| m-, p-Xylene | 9.3 |
| o-Xylene | 3.5 |
| $C_9$-aromatics | 5.6 |
| Total aromatics | 74.3 |

[1] Measured by gaschromatographic analysis.

In the first stage of the process of this invention, cobalt-molybdenum catalyst obtained in the market which was prepared by supporting cobalt salts and molybdate on an alumina carrier was used. The reaction conditions of liquid hourly space velocity of 2.8, molar ratio of hydrogen to feed stocks of 1.0:1.0, reaction pressure of 55 kg./cm.$^2$ gauge, and an average reaction temperature of 205° C. were employed.

As a result, product oil having diene value of 1.9, bromine number of 17.4 and sulfur content of 0.038 wt. percent was obtained.

The product was introduced to the second stage of the process of this invention, where the reaction was effected at an average temperature of 372° C. in the presence of the same catalyst composoition as in the preceding first stage, i.e., cobalt-molybdenum catalyst.

Product oil having diene value of 0, bromine number of 0.75 and sulfur content of 43 p.p.m. was obtained.

To the product of the second stage, there was added hydrogen gas containing 9 mol percent of methane so as to make molar ratio of the pure hydrogen to the product oil of about 5.2:1, and the mixture was subsequently led to the third stage.

There, the reaction was effected under the conditions including a reaction pressure of 23 kg./cm.$^2$ gauge, inlet temperature of 650° C., and outlet temperature of 713° C. As a result, the following products were obtained.

Table 2.—Reaction Products in the Third Stage

| | Wt. percent/feed stocks |
|---|---|
| Methane | 19.4 |
| Ethane | 16.3 |
| Propane | 0.4 |
| Benzene | 52.4 |
| $C_9$ aromatics | 0.8 |
| Heavy oil | 3.3 |

The reaction product of the third stage was subjected to liquid-gas separation and the liquid product was introduced to the fourth stage where benzene was as distillate separated in a column still having 40 theoretical plates. The benzene thus obtained was subsequently treated with active clay to give 51% by weight of benzene based on the weight of feed stocks.

The properties of the resultant high-purity benzene was given in the following Table 3:

Table 3

| | |
|---|---|
| Specific gravity (15/4° C.) | 0.8837. |
| Solidifying point (° C.) | 5.45. |
| Thiophene content (g./100 cc.) | Below 0.0001. |
| Carbon disulfide (g/100 cc.) | Below 0.0001. |
| Copper corrosion | Nil. |
| Acid wash color | Nil. |
| Reaction | Neutral. |
| Color | Satisfactory. |
| Distillation test: | |
| Initial boiling point | 79.9° C. |
| 50% | 80.1° C. |
| End point | 80.2° C. |
| Total distillate (vol. percent) | 98.0° C. |

Example 2

The same feed stocks as used in Example 1 was treated in the first stage in the presence of palladium catalyst under the reaction conditions of a reaction temperature of from 30° to 45° C., a reaction pressure of 45 kg./cm.² gauge, and hydrogen-to-feed stocks molar ratio of 0.28:1. As a result, product oil having diene value of 1.2, bromine number of 24.7 and sulfur content of 0.047 wt. percent was obtained.

To the product oil obtained in the first stage, there was added hydrogen to make hydrogen-to-feed stocks molar ratio of 1.0:1.0 and the mixture was introduced to the second stage and brought into contact with the same cobalt-molybdenum catalyst as in Example 1 at an average temperature of 385° C. to give a product oil having diene value of 0, bromine number 0.48 and sulfur content of 28 p.p.m.

To the product of the second stage, there was added hydrogen gas containing 9 mol percent of methane so as to make pure hydrogen-to-feed stocks molar ratio of about 6.5:1, and the mixture was subsequently led to the third stage.

There, the reaction was effected under the conditions of a reaction pressure of 45 kg./cm.² gauge and an average reaction temperature of 650° C., and the product thus obtained was subjected to liquid-gas separation and the liquid product was then introduced to the fourth stage where benzene was as distillate separated in a column still having 40 theoretical plates. The benzene thus obtained was subsequently treated with activated clay to give about 48% by weight of benzene based on the weight of the feed stocks. The properties of the benzene was substantially the same as those in Example 1.

Example 3

This example illustrates the effect of the omission of the first and second hydrogenation stages of the present invention. The same feed stocks as in Example 1 was fed directly to the third stage of the process. Reaction was effected under conditions of an average reaction temperature of 680° C., a reaction pressure of 20 kg./cm.² gauge, and hydrogen-to-oil molar ratio of 5.3:1.

Carbonaceous polymer was formed at the heated portions of equipment within a few hours after the starting of the operation and continuation thereof was made impossible due to the pressure drop.

Example 4

This example illustrates the effect of the ommission of the first hydrogenation stage of the present invention. The same feed stocks as in Example 1 was introduced directly to the second stage of the process, i.e. skipping the first stage, where the reaction was effected in the presence of the same cobalt-molybdenum catalyst as in Example 1 under the same conditions as described in the second stage of the process of Example 1.

As a result, the pressure drops at heated portions and reaction sections took place within a few hours after the starting of the operation, and after 50 hours, the continuation of operation was at last made impossible.

Example 5

This example illustrates the effect of the omission of the second stage of the present invention. The same feed stocks as in Example 1 was introduced to the first stage of the process and the reaction was effected in the presence of cobalt-molybdenum catalyst under conditions of liquid hourly space velocity of 2.8, hydrogen-to-oil molar ratio of 1.0:1.0, a reaction pressure of 55 kg./cm.² gauge, and an average reaction temperature of 205° C.

The product thus obtained was led to the third stage of the process, i.e., skipping the second stage, wherein hydrogen gas containing 9 mol. percent of methane was added thereto so as to make hydrogen-to-oil molar ratio of 5.3:1, and the reaction was effected under conditions of a reaction pressure of 23 kg./cm.² gauge, an average reaction temperature of 695° C.

The product thus obtained was subjected to liquid-gas separation and the liquid product was introduced to the fourth stage where benzene was separated in a column still having 40 theoretical plates. The benzene obtained as distillate was subsequently treated with activated clay to give about 51% by weight of benzene based on the weight of feed stocks.

The properties of the product are shown in the following table from which it is noted that the high-purity benzene as in Example 1 is not obtained in this example.

Table 4

| | |
|---|---|
| Specific gravity (15/4° C.) | 0.8840. |
| Solidifying point (°C.) | 5.45. |
| Thiophene (g./100 cc.) | 0.0098. |
| Carbon disulfide (g./100 cc.) | 0.0002. |
| Copper corrosion | Brown. |
| Acid wash color | Nil. |
| Reaction | Neutral. |
| Color | Satisfactory. |
| Distillation test: | |
|     Initial boiling point | 79.4° C. |
|     50% | 80.0° C. |
|     End point | 80.1° C. |
|     Total distillate (vol. percent) | 98.0° C. |

What we claim is:

1. Process for the production of high-purity benzene from thermal cracked residue obtained as a by-product in the production of gaseous olefin such as ethylene by steam cracking of petroleum, which comprises the stages of (1) bringing said thermal cracked residue into contact with 0.2 to 2.0 mols of hydrogen per mol of said thermal cracked residue in the presence of hydrogenation catalyst at a temperature of from ambient temperature to 250° C. and under a pressure of from 10 to 80 kg./cm.² gauge; (2) further bringing the product obtained in the preceding first stage into contact with hydrogen in the presence of hydrogenation catalyst at a temperature of from 300° to 450° C.; and (3) subjecting the product obtained in the second stage to hydrocracking and hydrodealkylation reactions in the absence of a solid dealkylation catalyst under conditions including a temperature of from 500° to 850° C. and a pressure of from 10 to 60 kg./cm.² gauge and in contact with 2 to 10 mols of hydrogen per mol of the thermal cracked residue.

2. Process for the production of high-purity benzene from thermal cracked residue obtained as a by-product in the production of gaseous olefin such as ethylene by steam cracking of petroleum, which comprises the stages of (1) bringing said thermal cracked residue into contact with 0.2 to 2.0 mols of hydrogen per mol of said thermal cracked residue in the presence of hydrogenation catalyst at a temperature of from ambient temperature to 250° C. under a pressure of from 10 to 80 kg./cm.² gauge to convert diolefin contained in said thermal cracked residue to mono-olefinic and paraffinic hydrocarbons; (2) further bringing the product obtained in the preceding first stage into contact with hydrogen in the presence of hydrogenation catalyst at a temperature of from 300° C. to 450° C. to convert olefin contained in said product into paraffinic hydrocarbons, and, simultaneously, to convert sulfur compounds contained in said thermal cracked residue consisting mainly of thiophenes into hydrogen sulfide which is then separated and removed; (3) subjecting the product obtained in the second stage to hydrocracking of said paraffinic hydrocarbon in the absence of a solid dealkylation catalyst to convert them into lower saturated hydrocarbons such as methane, ethane, etc., and, simultaneously, to hydrodealkylation of the alkylaromatic hydrocarbons contained in the thermal cracked residue to convert them into benzene under conditions including a temperature of from 500° to 850° C. and a pressure of 10 to 60 kg./cm.$^2$ gauge and in contact with 2 to 10 mols of hydrogen per mol of the thermal cracked residue; and (4) recovering benzene from the product of the third stage.

3. Process according to claim 1 wherein the thermal cracked residue used consists predominantly of hydrocarbons having 6 to 9 carbon atoms, a diene value of 10 to 25, and content of aromatics consisting essentially of monocyclic compounds of 70 to 95%.

4. Process according to claim 1 wherein the third stage is performed at a temperature of from 650° to 730° and at a liquid hourly space velocity of from 1 to 6.

References Cited

UNITED STATES PATENTS

| | | | |
|---|---|---|---|
| 2,876,268 | 3/1959 | Ciapetta et al. | 260—674 |
| 3,198,846 | 8/1965 | Kelso | 260—672 |
| 3,215,618 | 11/1965 | Watkins | 208—143 |
| 3,222,410 | 12/1965 | Swanson | 260—672 |
| 3,287,431 | 11/1966 | Feigelman | 260—672 |
| 3,291,849 | 12/1966 | King et al. | 260—672 |
| 3,296,120 | 1/1967 | Doelp et al. | 260—674 |
| 3,296,323 | 1/1967 | Myers et al. | 260—672 |
| 3,310,592 | 3/1967 | Fukuda et al. | 260—672 |

OTHER REFERENCES

Fowle et al., "Thermal Hydrodealkylation," Chem. Eng. Prog. 58 (4), 37–40 (1962).

DELBERT E. GANTZ, *Primary Examiner.*

G. E. SCHMITKONS, *Assistant Examiner.*